Sept. 21, 1971  BEN KRAUS, JR  3,606,738
FLUID SEPARATOR
Filed Dec. 2, 1969
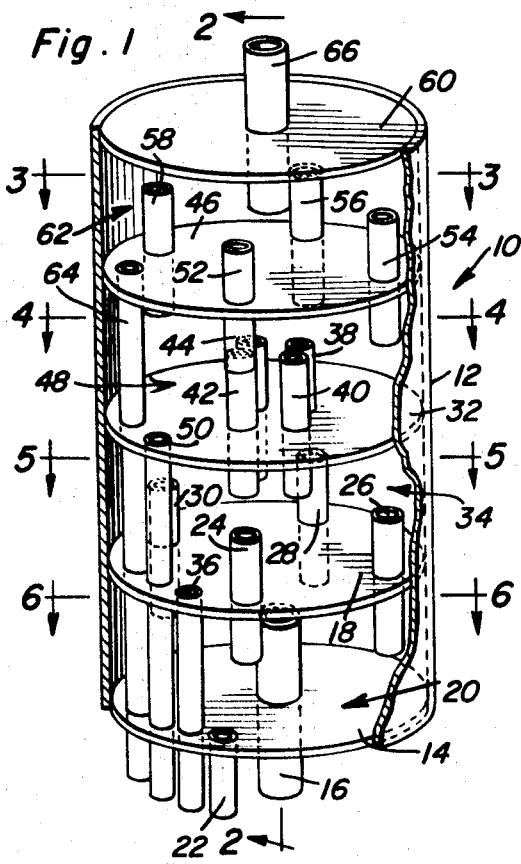
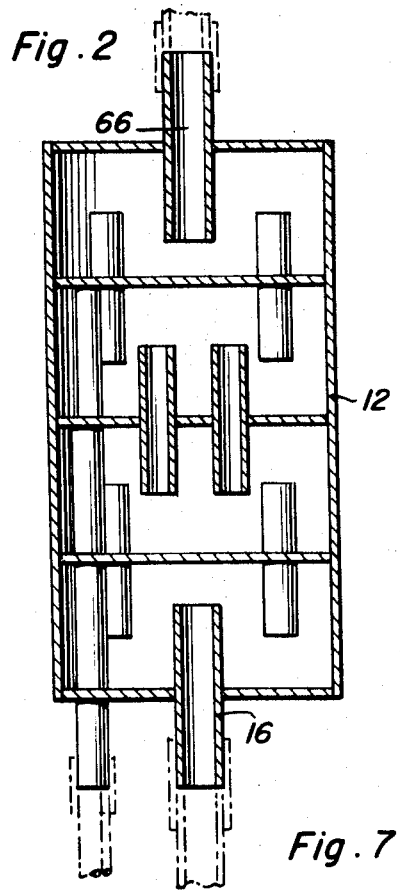
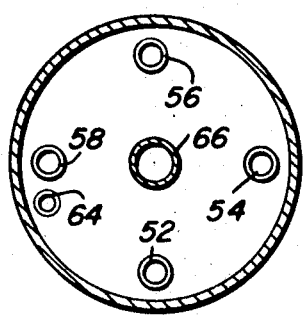
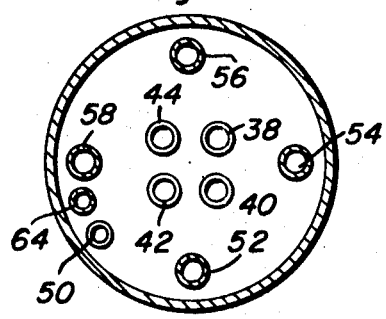
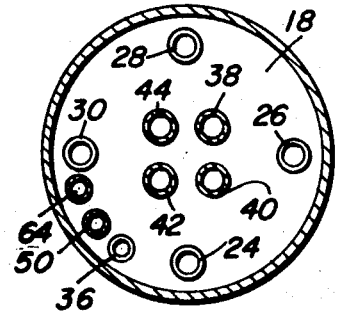
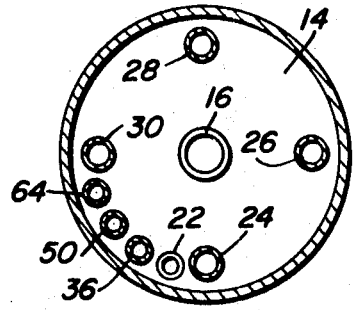
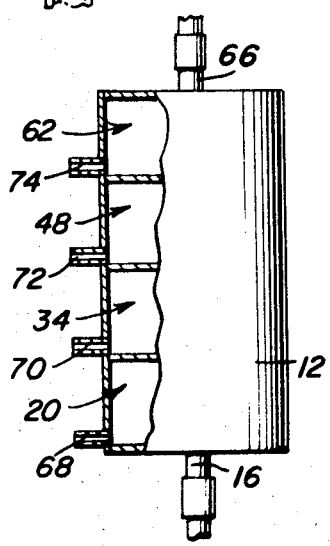
Ben Kraus, Jr.
INVENTOR.

United States Patent Office 3,606,738
Patented Sept. 21, 1971

3,606,738
FLUID SEPARATOR
Ben Kraus, Jr., 3101 Washington Pike,
Bridgeville, Pa. 15017
Filed Dec. 2, 1969, Ser. No. 881,447
Int. Cl. B01d 45/08
U.S. Cl. 55—446
2 Claims

ABSTRACT OF THE DISCLOSURE

A number of axially spaced baffle plates are enclosed within a cylindrical housing having inlets at one end and an outlet at the other end. The spaced baffle plates define a plurality of adjacent chambers through which inlet fluid sequentially passes. Ports in each baffle plate are in offset relation to the ports in an adjacent baffle plate so that the fluid flowing into any given chamber is caused to impinge upon the baffle plate in that chamber thereby resulting in the separation of a heavier constituent from the composite fluid flowing through the chamber. As an end result of sequential impinging action against the spaced baffle plates, a relatively liquid free gas is emitted from the outlet end of the fluid separator.

The present invention relates to a baffle assembly for separating liquid from a gaseous composite and is more particularly adapted for use on a boiler for distributing steam which is relatively liquid free.

When using a water boiler, it is generally necessary to use chemicals for treating water used in the boiler for the purpose of minimizing pitting and scaling of the boiler. Frequently, these chemicals cause foaming and priming action in the boiler which decreases the efficiency of the boiler. Also, in small and medium sized boilers, particularly of the package type, there is a small clearance between the water level and the steam outlet of the boiler. As a result of this small clearance, the boiling water having chemicals therein is sometimes carried into the steam header and is distributed to steam lines and heaters. This results in waterlogging of all heaters which subjects the heaters to freeze-ups and other maintenance problems in addition to low heat output.

The present invention is an accessory for insertion between the outlet lines of a boiler and the distribution lines emanating therefrom. The device consists of a plurality of baffles which causes the separation of water from the vapor delivered by the boiler which includes a substantial quantity of water liquid mixed with steam. After separating the liquid constituent of the composite vapor, the present device delivers relatively pure steam to the distributing lines which minimizes the likelihood of maintenance to the distributing lines and heaters.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a cutaway view illustrating the interior components of the present fluid separator.

FIG. 2 is a vertical sectional view taken along a plane passing through section line 2—2 of FIG. 1.

FIG. 3 is a transverse sectional view taken along a plane passing through section line 3—3 of FIG. 1.

FIG. 4 is a transverse sectional view taken along a plane passing along section line 4—4 of FIG. 1.

FIG. 5 is a transverse sectional view taken along a plane passing through section line 5—5 of FIG. 1.

FIG. 6 is a transverse sectional view taken along a plane passing through section line 6—6 of FIG. 1.

FIG. 7 is a partial cutaway view illustrating the use of alternate drains in the fluid separator.

The components of the present invention are clearly shown in FIG. 1 and is generally indicated by the reference numeral 10. The illustrated fluid separator includes a cylindrical housing 12 which mounts a bottom disk-like plate 14 having a centrally disposed aperture for receiving an inlet line 16 which extends inwardly and terminates in coaxially spaced relation to a second disk-like plate 18. The plates 14 and 18 serve as baffle plates defining a lower chamber 20 into which a composite fluid is delivered after passing through the inlet line 16. The composite fluid when used in conjunction with the boiler includes steam mixed with a water composite. The delivery end of inlet line 16 confronts a solid surface portion of baffle plate 18 so that as the composite fluid impinges against plate 18, the water constituent remains on the plate and eventually falls down to the end plate 14. After a sufficient quantity of water has been accumulated on the end plate 14, a drain line 22 passing through plate 14 serves as an exit for the accumulated water.

Four tubular sections 24, 26, 28 and 30 are disposed in quadrant relation around the periphery of baffle plate 18. These tubular members hereinafter referred to as separator tubes serve as passage means for steam filling the lower chamber 20. The steam passing through the separator tubes is focussed for impingement against a coaxially spaced baffle plate 32. The impinging steam is once again reduced as additional liquid in the steam is retained by baffle plate 32. The resultant steam fills a second chamber 34 defined between the baffle plates 18 and 32. A second drain line 36 is received in baffle plate 18 and extends downwardly through the bottom plate 14 so that accumulated water falling from the baffle plate 32 can be discharged from the fluid separator.

Four separator tubes 38, 40, 42 and 44 pass through the baffle plate 32 and are positioned in close quadrature with each other. As will be noted, the separator tubes 38–44 are radially inwardly offset with respect to the separator tubes 24–30 received in baffle plate 18. Thus, steam passing through the lower separator tubes in plate 18 cannot flow directly through the upper separator tubes positioned in plate 32 but rather must impinge upon the solid underside of baffle plate 32. As will be noted in FIG. 1, another baffle plate 46 is positioned in upward coaxially spaced relation with baffle plate 32 thereby defining a chamber 48 therebetween. Accordingly, reduced steam fills chamber 48 after the steam has impinged against baffle plate 46. A third drain tube 50 is received within the baffle plate 32 to provide discharge for water which drops down from baffle plate 46.

An additional set of separator tubes 52, 54, 56 and 58 are disposed in quadrature around the periphery of baffle plate 46 and are offset with respect to the lower positioned separator tubes 38–44. Thus, direct communication between separator tubes 38–44 and the separator tubes 52–58 does not exist. Rather, the steam delivered by the separator tubes 38–44 impinges upon the central underside portion of baffle plate 46 serving to separate more liquid from the impinging steam.

An upper end plate 60 is positioned in coaxially spaced relation with the baffle plate 46 and serves as a final baffle plate for the fluid separator. The plates 46 and 60 define a final chamber 62 which is filled by the finally reduced steam which has already impinged upon end plate 60. A fourth drain tube 64 is received within baffle plate 46 and passes downwardly through the other baffle plates for final termination outside the fluid separator. As in the case of the other drain tubes, the drain tube 64 provides a water discharge route for water which drops down from the upper end plate 60. Finally reduced steam is discharged through outlet tube 66 received through a central aperture in end plate 60. By virtue of sequential impingement on the coaxially spaced baffle plates, the steam being discharged to outlet line 66 is relatively free of water and constitutes a relatively pure steam discharge for boiler distribution lines.

Referring to FIG. 7, a modification is shown. More particularly, instead of the axially disposed drain lines 22, 36, 50 and 64, there can be used radially extending tubular elements 68, 70, 72 and 74 respectively communicate with chambers 20, 34, 48 and 62. The choice of drain pipe design is a matter of preference by the user and will sometimes depend upon space requirements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A self-contained fluid separator for insertion within a flow line, said separator including a vertically elongated closed housing comprising a substantially cylindrical peripheral wall and upper and lower end plates secured thereto, a plurality of vertically spaced horizontal baffle plates within and extending across said housing defining a series of chambers including a lower end chamber, an upper end chamber and several intermediate chambers, each baffle plate being peripherally sealed to the housing wall, a flow inlet line extending centrally through the lower end plate and communicating the lower end chamber with the exterior of said housing, said inlet line having a lower end positioned in downwardly spaced relation to the lower end plate and an upper end positioned centrally within the lower end chamber between the lower end plate and the next adjacent baffle plate, an outlet line extending through the upper end plate and projecting both upwardly and downwardly therebeyond, the lower end of said outlet line terminating approximately at mid-height in the upper end chamber, each of said baffle plates having a plurality of flow accommodating tubes fixed thereto and projecting transversely therethrough, each of said tubes projecting beyond both sides of the corresponding baffle plate and approximately mid-way into the adjacent chambers, the tubes on each baffle plate being offset from the tubes in the next adjacent baffle plate and said inlet line and said outlet line, and a separate drain line connected with and communicating each chamber, adjacent the lower end thereof, directly with the exterior of the housing.

2. The structure of claim 1 wherein each drain line extends vertically through the housing to the exterior thereof below said lower end plate, the drain of each chamber above the lower end chamber comprising a continuous hollow tube which extends through the intermediate chambers in sealed relation thereto.

References Cited

UNITED STATES PATENTS

| | | | |
|---|---|---|---|
| 1,116,596 | 11/1914 | Lather | 55—442 |
| 1,352,648 | 9/1920 | Beyer et al. | 55—441 |
| 1,542,437 | 6/1925 | Davenport | 55—441 |
| 1,606,749 | 11/1926 | Clark et al. | 55—436 |

FRANK W. LUTTER, Primary Examiner

B. NOZICK, Assistant Examiner

U.S. Cl. X.R.

55—465, 466